(12) United States Patent
Okano (10) Patent No.: US 11,599,012 B2
(45) Date of Patent: Mar. 7, 2023

(54) CONNECTING DEVICE OF ACCESSORY THAT IS DETACHABLY ATTACHED TO ACCESSORY SHOE DEVICE OF ELECTRONIC APPARATUS, ACCESSORY, ACCESSORY CONNECTING MECHANISM, AND ELECTRONIC APPARATUS SYSTEM

(71) Applicant: CANON KABUSHIKI KAISHA, Tokyo (JP)

(72) Inventor: Yoshinobu Okano, Shiraoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 399 days.

(21) Appl. No.: 16/784,570

(22) Filed: Feb. 7, 2020

(65) Prior Publication Data

US 2020/0264496 A1 Aug. 20, 2020

(30) Foreign Application Priority Data

Feb. 19, 2019 (JP) .............................. JP2019-027511

(51) Int. Cl.
  *G03B 17/56* (2021.01)
  *H01R 13/436* (2006.01)
  (Continued)

(52) U.S. Cl.
  CPC .......... *G03B 17/566* (2013.01); *H01R 13/26* (2013.01); *H01R 13/4364* (2013.01);
  (Continued)

(58) Field of Classification Search
  CPC ............ G03B 2215/056; G03B 17/566; G03B 15/041–0436
  See application file for complete search history.

(56) References Cited

U.S. PATENT DOCUMENTS

| 8,314,882 B2 | 11/2012 | Takano |
| 8,781,315 B2 | 7/2014 | Miyakawa et al. |

(Continued)

FOREIGN PATENT DOCUMENTS

| CN | 103296530 A | 9/2013 |
| CN | 106030960 A | 10/2016 |

(Continued)

OTHER PUBLICATIONS

Niekerk "Repairing the Canon 580EX hotshoe foot", https://neilvn.com/tangents/repairing-the-canon-580ex-hotshoe-foot/ dated May 2007 (Year: 2007).*

(Continued)

*Primary Examiner* — Leon W Rhodes, Jr.
(74) *Attorney, Agent, or Firm* — Venable LLP (57) ABSTRACT

A connecting device of an accessory by which improvement in mechanical strength is compatible with arrangements of many connection terminals. The connecting device is detachably attachable to an accessory shoe device of an electronic apparatus. An engagement member is attachable to the accessory shoe device by sliding in a first direction. A holding member is fixed to the engagement member by fastening members. A connecting plug has connection terminals and is arranged at a front part in the first direction of the holding member. The fastening members are arranged at positions that are spaced apart from each other in a second direction that perpendicularly intersects with the first direction. A width of the holding member is shorter than a width of the engagement member in the second direction, and the connection terminals are arranged in an area between the positions of the fastening members.

11 Claims, 8 Drawing Sheets

(51) Int. Cl.
  *H04N 5/225* (2006.01)
  *H01R 13/26* (2006.01)
  *H01R 13/621* (2006.01)
(52) U.S. Cl.
  CPC ......... *H01R 13/621* (2013.01); *H04N 5/2254* (2013.01); *H04N 5/2256* (2013.01); *G03B 2215/056* (2013.01); *H04N 5/225* (2013.01); *H04N 5/2251* (2013.01)

(56) References Cited

U.S. PATENT DOCUMENTS

| | | | |
|---|---|---|---|
| 8,891,003 | B2 | 11/2014 | Shintani et al. |
| 9,985,399 | B2 | 5/2018 | Seo |
| 10,591,807 | B2 | 3/2020 | Kamiya et al. |
| 10,989,990 | B2 | 4/2021 | Kamiya et al. |
| 2009/0128688 | A1 | 5/2009 | Takano |
| 2010/0166418 | A1 | 7/2010 | Hwang |
| 2013/0010185 | A1* | 1/2013 | Motoki .................. H01R 24/62 348/E5.025 |
| 2013/0223831 | A1 | 8/2013 | Miyakawa et al. |
| 2015/0215483 | A1 | 7/2015 | Farnsworth |
| 2017/0222384 | A1 | 8/2017 | Seo |
| 2017/0336019 | A1 | 11/2017 | Liu et al. |
| 2018/0348604 | A1 | 12/2018 | Kamiya et al. |
| 2020/0174348 | A1 | 6/2020 | Kamiya et al. |

FOREIGN PATENT DOCUMENTS

| | | |
|---|---|---|
| CN | 107065401 A | 8/2017 |
| CN | 107390456 A | 11/2017 |
| CN | 108989627 A | 12/2018 |
| JP | H06-214291 A | 8/1994 |
| JP | 2009-122542 A | 6/2009 |
| JP | 2013-178350 A | 9/2013 |
| JP | 2017-138455 A | 8/2017 |
| JP | 2018-084681 A | 5/2018 |

OTHER PUBLICATIONS

Feb. 7, 2022 Chinese Official Action in Chinese Patent Appln. No. 202010096643.6.

Jul. 26, 2021 Chinese Official Action in Chinese Patent Appln. No. 202010096643.6.

Jan. 17, 2023 Japanese Official Action in Japanese Patent Appln. No. 2019-027511.

* cited by examiner

CONNECTING DEVICE OF ACCESSORY THAT IS DETACHABLY ATTACHED TO ACCESSORY SHOE DEVICE OF ELECTRONIC APPARATUS, ACCESSORY, ACCESSORY CONNECTING MECHANISM, AND ELECTRONIC APPARATUS SYSTEM

BACKGROUND OF THE INVENTION

Field of the Invention

The present invention relates to a connecting device of an accessory that is used to detachably attach the accessory to an electronic apparatus, the accessory having the connecting device, an accessory connecting mechanism including the connecting device and an accessory shoe device of the electronic apparatus, and an electronic apparatus system including the accessory and the electronic apparatus.

Description of the Related Art

There is a known image pickup apparatus, such as a digital camera, that is provided with an accessory shoe device to enable attachment and detachment of an accessory for photographing, such as a lighting device (an electronic flash device). Generally, an accessory shoe device has an engagement member that enables attachment and detachment of a connecting device of an accessory. Each of the accessory shoe device and connecting device is provided with connection terminals that enable two-way communications between the image pickup apparatus and accessory.

A conventional image pickup apparatus communicates with an accessory through five connection terminals provided in each of the accessory shoe device and connecting device, for example. However, since variety of accessories is diversified and functions of accessories increase in recent years, the conventional five connection terminals become short. Accordingly, Japanese Laid-Open Patent Publication (Kokai) No. 2018-084681 (JP 2018-084681A) discloses an image pickup apparatus having an accessory shoe device that increases the number of connection terminals and an electronic view finder having a shoe device as a connecting device that has connection terminals corresponding to the accessory shoe device. The accessory shoe device and shoe device disclosed in the above-mentioned publication increase the number of connection terminals within a shape of an engagement member while maintaining compatibility with the conventional five connection terminals (communication pins).

The accessory shoe device and connecting device receive pressure that maintains an attached state and strong stress that is due to external force that acts on the accessory, for example. Against this, a shoe device (connecting device) that has many connection terminals as described in the above-mentioned publication gives priority to securing of an area required for arranging the many connection terminals and for arranging parts needed to connect with an accessory shoe device. Accordingly, since a connecting structure between the parts constituting the shoe device is restricted, it is not easy to obtain sufficient mechanical strength.

SUMMARY OF THE INVENTION

The present invention provides a connecting device by which improvement in mechanical strength is compatible with arrangements of many connection terminals and parts needed to connect with an accessory shoe device.

Accordingly, a first aspect of the present invention provides a connecting device of an accessory that is detachably attachable to an accessory shoe device of an electronic apparatus, the connecting device including an engagement member that is attachable to the accessory shoe device by sliding in a first direction with respect to the accessory shoe device, a holding member that holds the engagement member, a plurality of fastening members that fix the engagement member and the holding member, and a connecting plug that has a plurality of connection terminals and is arranged at a front part in the first direction of the holding member. The plurality of fastening members are arranged at positions that are spaced apart from each other in a second direction that perpendicularly intersects with the first direction. A width of the holding member is shorter than a width of the engagement member in the second direction, and the plurality of connection terminals are arranged in an area between the positions of the plurality of fastening members.

Accordingly, a second aspect of the present invention provides a connecting device of an accessory that is detachably attachable to an accessory shoe device of an electronic apparatus, the connecting device including an engagement member that is attachable to the accessory shoe device by sliding in a first direction with respect to the accessory shoe device, a holding member that holds the engagement member, a plurality of fastening members that fix the engagement member and the holding member, a connecting plug that has a plurality of connection terminals and is arranged at a front part in the first direction of the holding member, and a lock pin that regulates a position of the connecting device for the electronic apparatus. The plurality of fastening members are arranged at positions that are spaced apart from each other in a second direction that perpendicularly intersects with the first direction. The lock pin is arranged in an area between the positions of the plurality of fastening members in the second direction.

Accordingly, a third aspect of the present invention provides a connecting device of an accessory that is detachably attachable to an accessory shoe device of an electronic apparatus, the connecting device including an engagement member that is attachable to the accessory shoe device by sliding in a first direction with respect to the accessory shoe device, a holding member that holds the engagement member, a plurality of fastening members that fix the engagement member and the holding member, and a connecting plug that is arranged at a front part in the first direction of the holding member. The plurality of fastening members are arranged at positions that are spaced apart from each other in a second direction that perpendicularly intersects with the first direction. The connecting plug includes a plurality of connection terminals, and a synchronizer contact that is electrically connected with the electronic apparatus. The synchronizer contact is arranged in an area between the positions of the plurality of fastening members in the second direction.

Accordingly, a fourth aspect of the present invention provides an accessory that is detachably attachable to an accessory shoe device of an electronic apparatus, the accessory including the connecting device of the first aspect and an accessory controller that communicates with the electronic apparatus through the connecting plug.

Accordingly, a fifth aspect of the present invention provides an accessory that is detachably attachable to an accessory shoe device of an electronic apparatus, the accessory including the connecting device of the second aspect and the accessory controller of the fourth aspect.

Accordingly, a sixth aspect of the present invention provides an accessory that is detachably attachable to an accessory shoe device of an electronic apparatus, the accessory including the connecting device of the third aspect and the accessory controller of the fourth aspect.

Accordingly, a seventh aspect of the present invention provides a connecting mechanism including the connecting device of the first aspect and an accessory shoe device including an engaged member that is engaged with the engagement member by sliding the connecting device in the first direction, and signal terminals that are arranged at a front part in the first direction and contact the plurality of connection terminals in a state where the engagement member is engaged with the engaged member.

Accordingly, an eighth aspect of the present invention provides a connecting mechanism including the connecting device of the second aspect and the accessory shoe device of the seventh aspect.

Accordingly, a ninth aspect of the present invention provides a connecting mechanism including the connecting device of the third aspect and the accessory shoe device of the seventh aspect.

Accordingly, a tenth aspect of the present invention provides an electronic apparatus system including an accessory that includes the connecting device of the first aspect and an electronic apparatus that includes the accessory shoe device of the seventh aspect.

Accordingly, an eleventh aspect of the present invention provides an electronic apparatus system including an accessory that includes the connecting device of the second aspect and an electronic apparatus that includes the accessory shoe device of the seventh aspect.

Accordingly, a twelfth aspect of the present invention provides an electronic apparatus system including an accessory that includes the connecting device of the third aspect and an electronic apparatus that includes the accessory shoe device of the seventh aspect.

The present invention is able to provide the connecting device that the improvement in mechanical strength is compatible with the arrangements of the many connection terminals and parts needed to connect with the accessory shoe device.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings. In this embodiment, an image pickup system (electronic apparatus system) that consists of a digital camera (an image pickup apparatus) and an external lighting device will be described. The digital camera is an example of an electronic apparatus equipped with an accessory shoe device. The external lighting device is an example of an accessory equipped with a connecting device constituted so as to be detachably attachable to the accessory shoe device of the digital camera. It should be noted that the connecting device and the accessory shoe device constitute an accessory connecting mechanism. However, an accessory equipped with the connecting device concerning the present invention is not limited to the external lighting device. An electronic view finder, a microphone for recording sound of a moving image, an image pickup apparatus, a communication apparatus, and an adapter for attaching an accessory may be used as an accessory. Moreover, an electronic apparatus equipped with the accessory shoe device constituted so as to engage with the connecting device is not limited to the image pickup apparatus.

Figure 1:
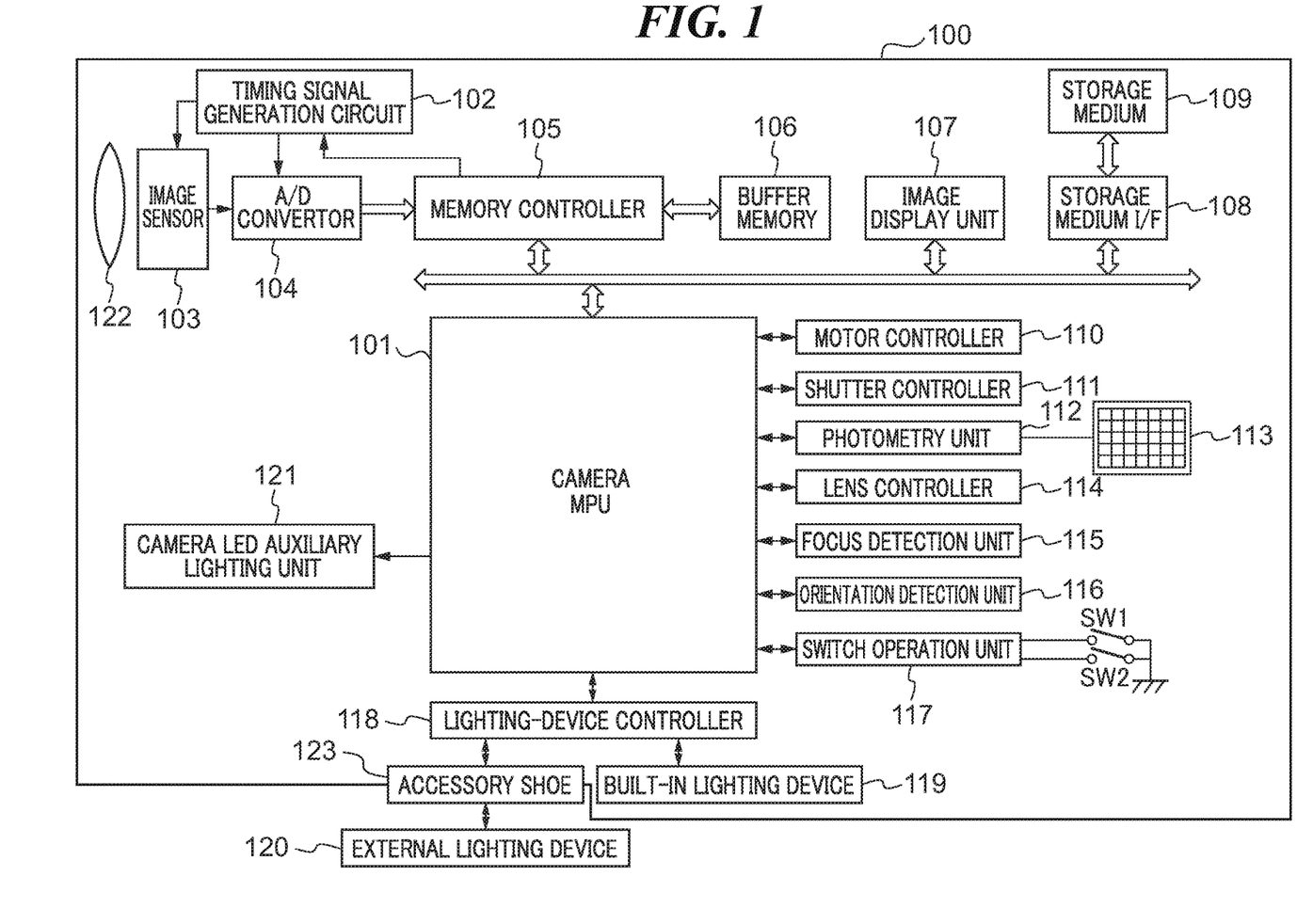
FIG. 1 is a block diagram schematically showing a configuration of a digital camera concerning an embodiment of the present invention.

FIG. 1 is a block diagram schematically showing a configuration of the digital camera 100. The digital camera 100 is provided with a microcontroller 101 (hereinafter referred to as a "camera MPU 101"), an image pickup optical system 122, a timing signal generating circuit 102, an image sensor 103, an A/D converter 104, a memory controller 105, and a buffer memory 106. Moreover, the digital camera 100 is provided with an image display unit 107, a storage medium I/F 108, a motor controller 110, a shutter controller 111, a photometry unit 112, a multi-division photometry sensor 113, a lens controller 114, a focus detection unit 115, an orientation detection unit 116, and a switch operation unit 117. Furthermore, the digital camera 100 is provided with a lighting-device controller 118, a built-in lighting device 119, a camera LED auxiliary lighting unit 121, and the accessory shoe device 123 (hereinafter referred to as an "accessory shoe 123"). The digital camera 100 allows insertion and extraction of a storage medium 109 and allows attachment and detachment of the external lighting device 120. It should be noted that the above configuration is an example of the digital camera 100 and some components other than the accessory shoe 123 may be omitted.

The camera MPU 101 controls actions of the entire image pickup system including a photographing sequence. The image pickup optical system 122 includes a plurality of lens groups, such as a zoom lens and a focusing lens, a diaphragm, and a shutter, and forms an optical image on the image sensor 103 by refracting reflected light from an object. The image sensor 103 is a CCD image sensor, a CMOS image sensor, or the like that converts the optical image formed by the reflected light from the object into an analog electrical signal. The timing signal generating circuit 102 generates a timing signal required to drive the image sensor 103.

The A/D converter 104 converts the analog electrical signal (analog image data) read from the image sensor 103 into a digital electrical signal (digital image data). The memory controller 105 controls reading and writing of a memory (not shown) and controls a refreshment operation of the buffer memory 106. The buffer memory 106 temporarily stores the digital image data output from the A/D converter 104 and image data displayed on the image display unit 107. The image display unit 107 has a display device, such as a liquid crystal panel or an organic EL panel, and displays the image data stored in the buffer memory 106.

The digital camera 100 is configured to enable insertion and extraction of the storage medium 109 like a memory card. The storage medium I/F 108 enables communication between the camera MPU 101 and the storage medium 109 that is currently mounted in the digital camera 100. It should be noted that the storage medium 109 may be a hard disk drive built in the digital camera 100.

The motor controller 110 drives a mirror (not shown) between a mirror-up position and a mirror-down position and charges the shutter at a time of an exposure operation by controlling motors (not shown) according to signals from the camera MPU 101. The shutter controller 111 controls the exposure operation by cutting electric current to the shutter (a shutter front curtain and a shutter rear curtain) provided in the image pickup optical system 122 according to a signal from the camera MPU 101 so that the shutter front curtain and the shutter rear curtain travel. The multi-division photometry sensor 113 divides an image-pickup region into a plurality of areas. The photometry unit 112 outputs signals from the multi-division photometry sensor 113 to the camera MPU 101 as luminance signals of the respective areas in the image-pickup region. The camera MPU 101 calculates values for exposure control, such as an AV (aperture value), a TV (shutter speed), ISO (sensitivity of the image sensor 103), on the basis of the luminance signals obtained from the photometry unit 112. Moreover, the photometry unit 112 outputs a luminance signal detected when the built-in lighting device 119 or the external lighting device 120 preliminary emits (pre-emits) light toward an object to the camera MPU 101. The camera MPU 101 calculates an emission amount (main emission amount) of the external lighting device 120 for main exposure (main photographing) on the basis of the luminance signal.

The lens controller 114 controls focus and aperture of the image pickup optical system 122 by controlling a lens motor and diaphragm motor (not shown) according to a communication with the camera MPU 101. The focus detection unit 115 detects a defocus amount to an object for automatic focusing control (auto-focusing (AF)) using a well-known phase difference detection method. The orientation detection unit 116 detects a tilt of the digital camera 100 in a rotational direction around a photographing optical axis. The switch operation unit 117 detects switchings of a SW1 (first switch) and a SW2 (second switch) and transmits a detection result to the camera MPU 101. The SW1 turns ON when a release button (not shown) is pressed in a first stroke (half press). The camera MPU 101 starts the AF and photometry in response to receiving the ON signal of the SW1. The SW2 turns ON when the release button is pressed in a second stroke (full press). The camera MPU 101 starts an exposure operation in response to receiving the ON signal of the SW2. It should be noted that a signal that occurs owing to an operation of an operating member (not shown) other than the SW1 and SW2 is also detected by the switch operation unit 117 and is transmitted to the camera MPU 101.

The external lighting device 120 is detachably attachable to the accessory shoe 123. According to instructions from the camera MPU 101, the lighting device controller 118 controls emission operations (preliminary emission, main emission, and auxiliary light emission, etc.) of the built-in lighting device 119 and controls the emission operations of the external lighting device 120 through the accessory shoe 123. Moreover, when detecting attachment of the external lighting device 120 to the accessory shoe 123, the lighting device controller 118 starts to supply electric current to the external lighting device 120 through the accessory shoe 123. The configuration of the accessory shoe 123 will be mentioned below in detail. It should be noted that a device other than the external lighting device 120 is also detachably attachable to the accessory shoe 123 as mentioned above.

The camera LED auxiliary light unit 121 irradiates an object with near-infrared light (LED auxiliary light) to project a predetermined pattern used as auxiliary light of the focus detection control by the focus detection unit 115. The camera MPU 101 functions as an auxiliary light controller that controls irradiation of the auxiliary light toward an object for the focus detection by the built-in lighting device 119 or the external lighting device 120 on the basis of the luminance signal output from the photometry unit 112. Specifically, the camera MPU 101 instructs emission of flash auxiliary light to the built-in lighting device 119 or the external lighting device 120 through the lighting device controller 118. Alternatively, the camera MPU 101 instructs emission of the LED auxiliary light to the camera LED auxiliary light unit 121 or instructs emission of the LED auxiliary light to an LED auxiliary lighting unit 207 (see FIG. 2) of the external lighting device 120 through the lighting device controller 118.

Figure 2:
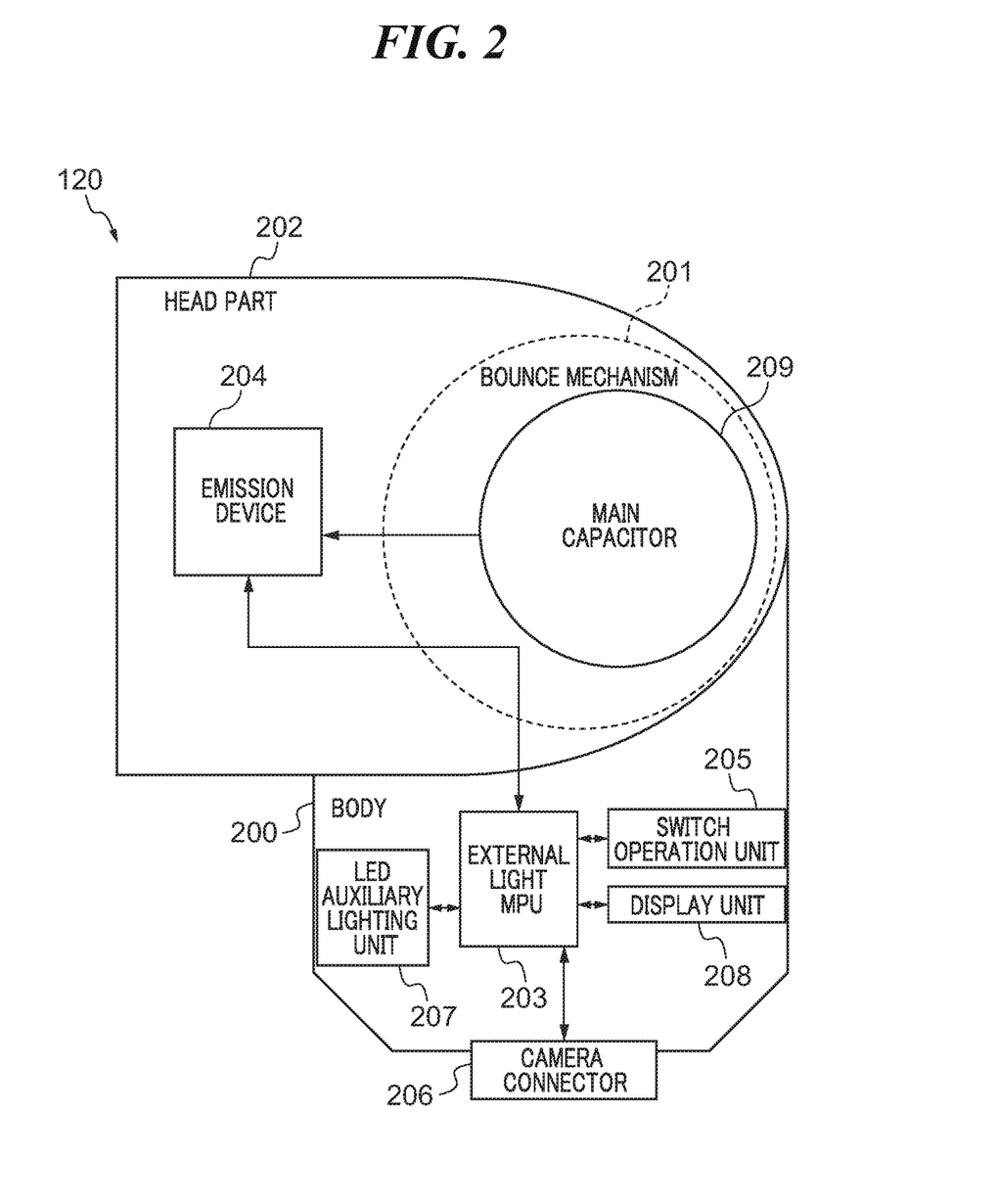
FIG. 2 is a block diagram schematically showing a configuration of an external lighting device concerning the embodiment.

FIG. 2 is a block diagram schematically showing a configuration of the external lighting device 120. The external lighting device 120 mainly consists of a body 200, a bounce mechanism 201, and a head part 202. The body 200 has an external light MPU 203, a switch operation unit 205 connected to various operation members like a power switch, a display unit 208, the LED auxiliary lighting unit 207, and a camera connector 206.

The external light MPU 203 is implemented in a main substrate (not shown) and functions as an accessories controller that controls all actions of the external lighting device 120 including an emission control sequence of the external lighting device 120. The camera connector 206 is a connecting device that mechanically and electrically connects the external lighting device 120 to the accessory shoe 123 of the digital camera 100. Necessary communications between the camera MPU 101 and the external light MPU 203 are performed through the lighting device controller 118, the accessory shoe 123, and the camera connector 206. Details of the configuration of the camera connector 206 will be mentioned later.

The LED auxiliary lighting unit 207 irradiates an object with near-infrared light (LED auxiliary light) to project a predetermined pattern used as auxiliary light of the focus detection control by the camera MPU 101 through the focus detection unit 115 as with the camera LED auxiliary light unit 121. The bounce mechanism 201 has a well-known mechanism that enables rotation of the head part 202 with respect to the body 200, and includes a main capacitor 209. The bounce mechanism 201 is used to direct the flash light in a direction that is not directed to an object, for example, and holds the head part 202 so as to be rotatable in the horizontal direction and the vertical direction with respect to the body 200. Use of the bounce mechanism 201 allows what is called bounce flash photographing by lighting an object indirectly. The head part 202 has an emission device 204 that emits flash light. The emission device 204 includes a discharge tube like a xenon tube or an LED required to emit flash light, a reflection umbrella, a Fresnel lens, and an emitting circuit for emitting flash light according to an emission signal from the external light MPU 203. These included elements are not shown in FIG. 2. It should be noted that the above configuration is an example of the external lighting device 120 and some components other than the camera connector 206 may be omitted.

Figure 3A:
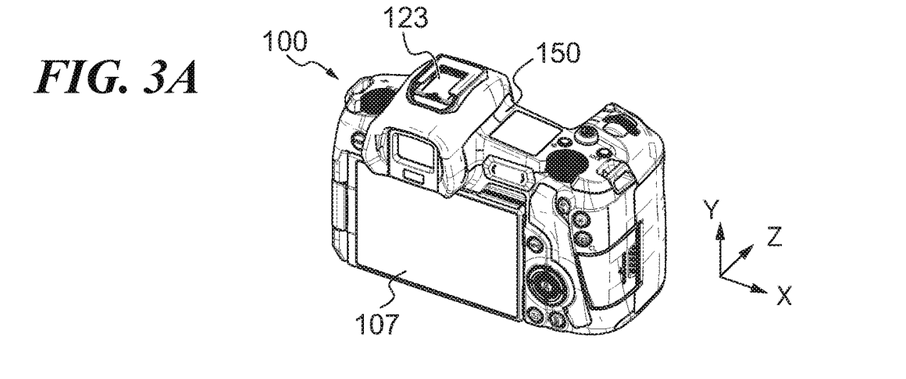
FIG. 3A is a perspective view showing the digital camera viewed from a rear side.
Figure 3B:
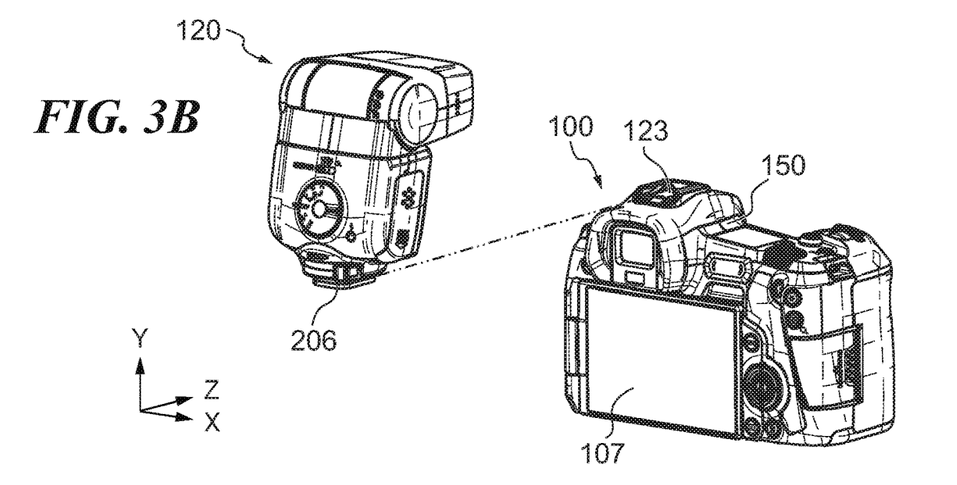
FIG. 3B is a perspective view showing a method for attaching the external lighting device to an accessory shoe of the digital camera.
Figure 3C:
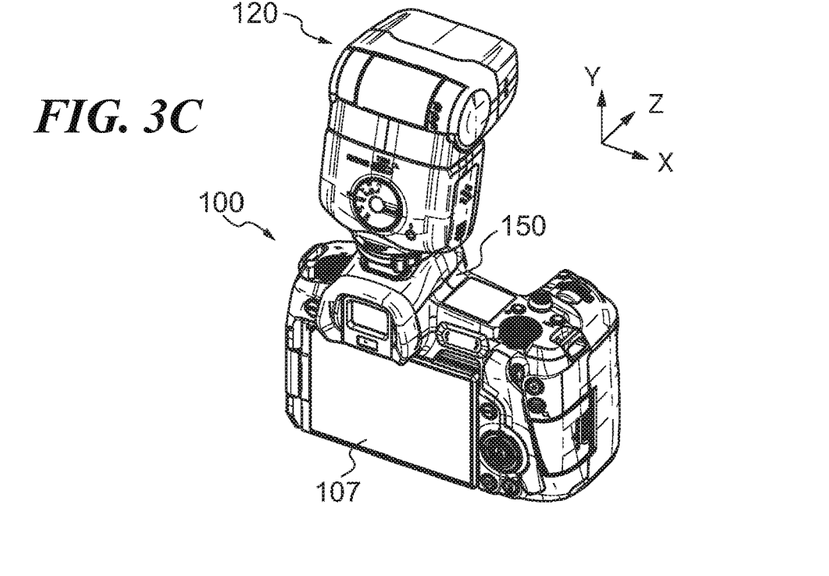
FIG. 3C is a perspective view showing a state where the external lighting device is attached to the digital camera viewed from the rear side.

FIG. 3A is a perspective view showing the digital camera 100 viewed from the rear side. FIG. 3B is a perspective view showing a method for attaching the external lighting device 120 to the accessory shoe 123 of the digital camera 100. FIG. 3C is a perspective view showing a state where the external lighting device 120 is attached to the digital camera 100 viewed from the rear side.

The image pickup optical system 122 (not shown in FIG. 3A, FIG. 3B, and FIG. 3C) is provided in the front side (the object side) of the digital camera 100 and the image display unit 107 is provided in the rear side of the digital camera 100. A top cover 150 as an exterior member is provided in the upper part of the digital camera 100. The accessory shoe 123 is arranged to the top cover 150. In the meantime, the camera connector 206 is provided in the bottom of the external lighting device 120. As shown in FIG. 3B, the camera connector 206 is engaged with the accessory shoe 123 by sliding the external lighting device 120 in parallel to a +Z direction (first direction) to the digital camera 100. Thereby, the external lighting device 120 is attached to the digital camera 100. The +Z direction is directed to the front side of the digital camera 100 from the rear side. Namely, the +Z direction is directed to the side of the image pickup optical system 122 (not shown) from the side of the image display unit 107. It should be noted that regulations of an X-direction (a second direction), a Y-direction (third direction), and the Z direction (front-and-rear direction) are common in the drawings from FIG. 3A. When the Z-direction is parallel to a horizontal plane, the X-direction perpendicularly intersects with the Z-direction in the horizontal plane. The X-direction is a width direction of the digital camera 100. The Y-direction perpendicularly intersects with both the Z-direction and X-direction. The Y-direction is a height direction of the digital camera 100.

Figure 4A:
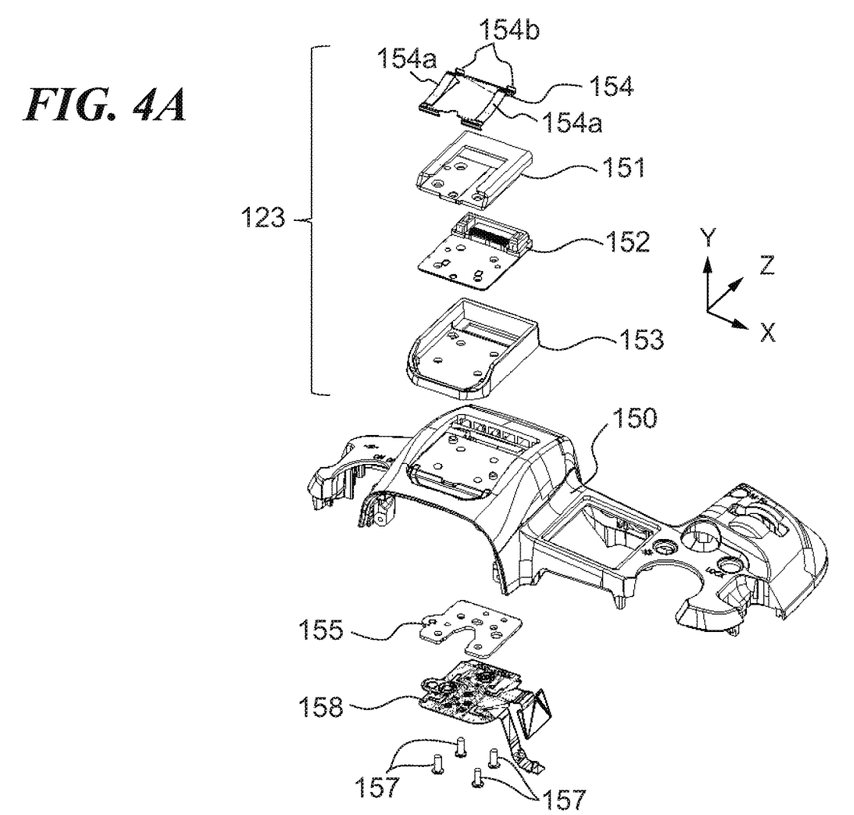
FIG. 4A is an exploded perspective view showing an accessory shoe device of the digital camera.
Figure 4B:
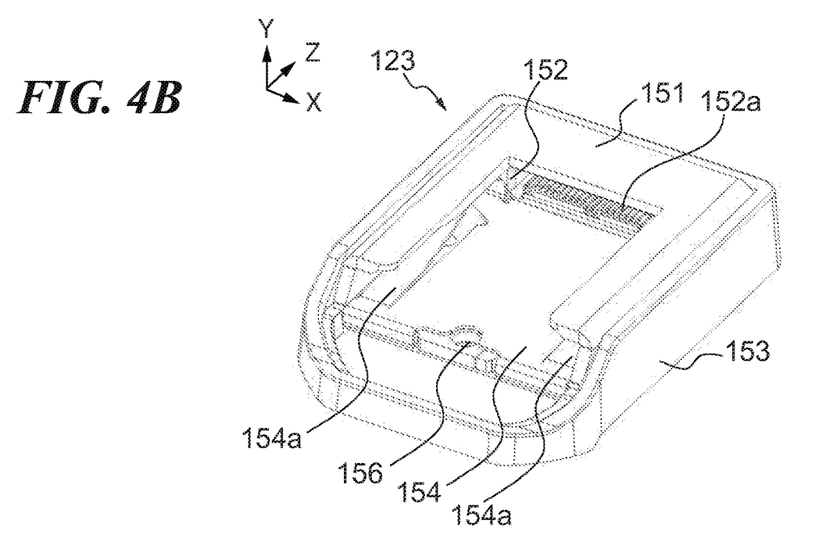
FIG. 4B is a perspective view showing the entire accessory shoe device.

Next, the accessory shoes 123 of the digital camera 100 will be described in detail. FIG. 4A is an exploded perspective view showing the accessory shoe 123. FIG. 4B is an entire perspective view showing the accessory shoe 123 (a perspective view showing an assembled state). The accessory shoe 123 is assembled to the top cover 150 in the Y-direction.

The accessory shoe 123 is provided with an engaged member 151, a signal terminal connector 152, a shoe stage 153, and an accessory shoe spring 154. The engaged member 151 is a member that is engaged with the external lighting device 120 to hold it. The signal terminal connector 152 is provided with a plurality of signal terminals 152a that are juxtaposed at equal pitches in the X-direction in a connector base member formed from synthetic resin material. The signal terminals 152a are arranged at the front part of the signal terminal connector 152 (the front side of the digital camera 100) in the Z-direction that is the attaching direction of the external lighting device 120 as shown in FIG. 4B. An engagement hole 156 that engages with a lock pin 252 (see FIG. 6A) of the external lighting device 120 is provided at the rear part (the rear side of the digital camera 100) of the signal terminal connector 152 in the Z-direction.

In the state where the external lighting device 120 is attached to the accessory shoe 123, the signal terminals 152a is electrically connected with the external lighting device 120. Moreover, the signal terminals 152a are electrically connected with a flexible substrate 158 arranged under the top cover 150 (the side in the -Y-direction). The flexible substrate 158 is connected to the main substrate (not shown) of the digital camera 100. Accordingly, the attachment of the external lighting device 120 to the accessory shoe 123 enables communications between the external lighting device 120 and the digital camera 100.

The shoe stage 153 is a housing member surrounding the engaged member 151 and signal terminal connector 152. An accessory shoe holding member 155 is a structure skeleton that holds the engaged member 151. As shown in FIG. 4A, four screws 157 are fastened to the engaged member 151 by inserting through the flexible substrate 158, accessory shoe holding member 155, top cover 150, shoe stage 153, and signal terminal connector 152. Thereby, these members are positioned and fixed. The members are combined with sufficient balance by respectively arranging the four screws 157 to four areas that are equally divided in the X-direction and the Z-direction.

The accessory shoe spring 154 is made from conductive material like metal. The accessory shoe spring 154 is provided with a pair of elastic deformation parts 154a that energize the external lighting device 120 (accessory) attached to the engaged member 151 in the Y-direction and a pair of abutting faces 154b on which the external lighting device 120 (accessory) abuts in the Z-direction.

Figure 5A:
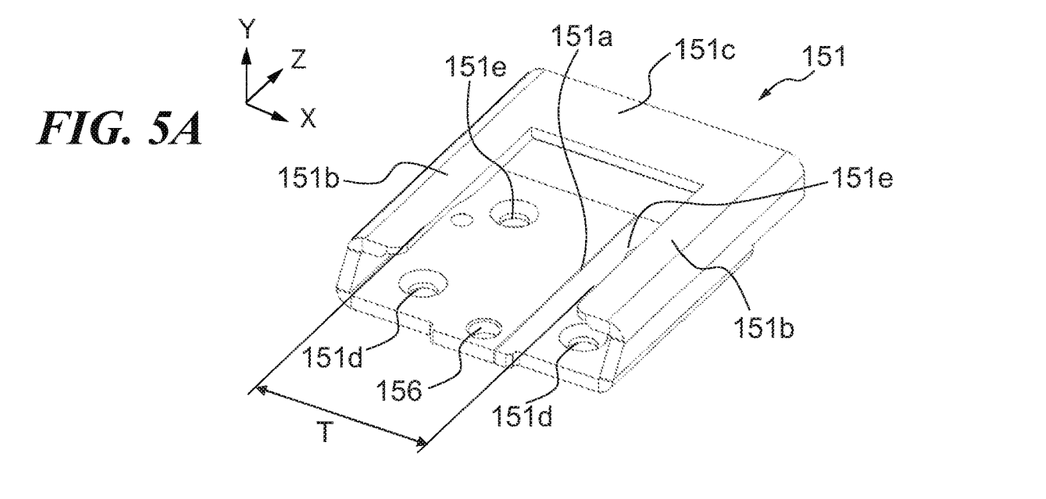
FIG. 5A, FIG. 5B, and FIG. 5C are views showing configurations of an engaged member of the accessory shoe device and a signal terminal connector.
Figure 5B:
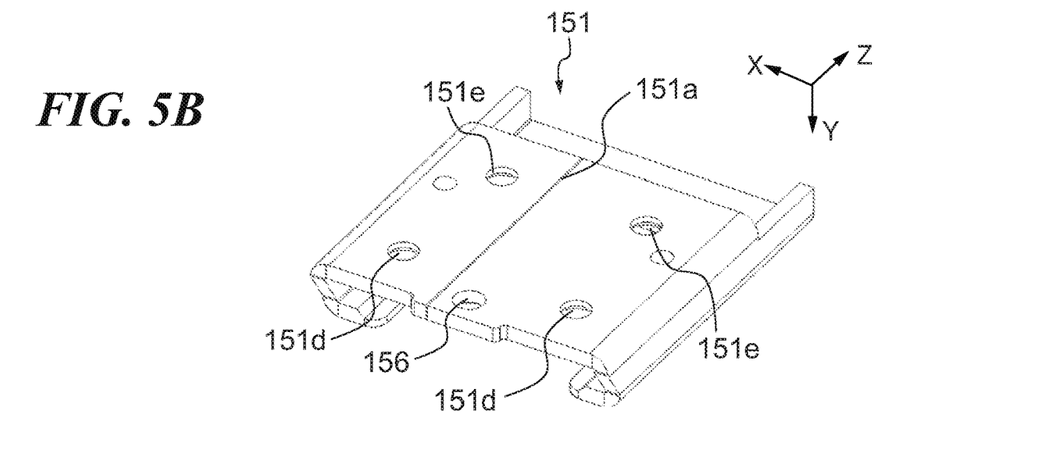
Figure 5C:
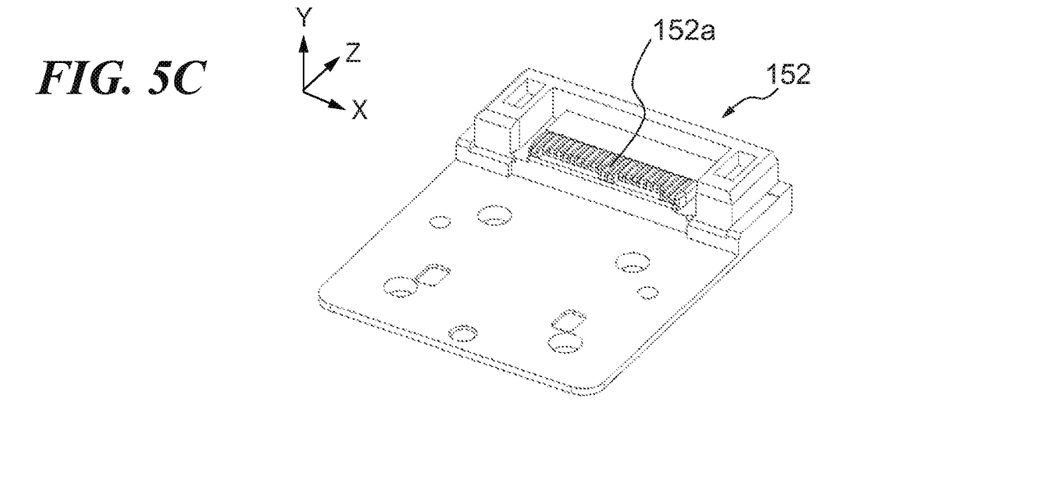

FIG. 5A is a perspective view showing a configuration of the upper side of the engaged member 151. FIG. 5B is a perspective view showing a configuration of the bottom side of the engaged member 151. FIG. 5C is a perspective view showing a configuration of the upper side of the signal terminal connector 152. The engaged member 151 is formed by bending a metal plate into a loop shape so that both end faces of the both bended edges in the X-direction are mutually faced and contacted at a joint 151a.

The engaged member 151 has a pair of engaged parts 151b and a connection part 151c that mutually connects the pair of engaged parts 151b. A pair of first screw holes 151d and a pair of second screw holes 151e used for fastening the screws 157 are formed in the engaged member 151. Moreover, the engagement hole 156 that engages with the lock pin 252 of the external lighting device 120 is formed in the engaged member 151.

As shown in FIG. 5A, the pair of engaged parts 151b are spaced apart from each other at a predetermined width (hereinafter referred to as a "engaged part distance T") in the X-direction. A holding member 254 (see FIG. 6A) of the external lighting device 120 is inserted into the engaged part distance T. The pair of first screw holes 151d are provided at a predetermined interval in the X-direction and function as a pair of first fastening holes that are provided at the predetermined interval in the X-direction at the rear part in the Z-direction (the rear side). The pair of second screw holes 151d are provided at the predetermined interval in the X-direction and function as a pair of second fastening holes that are provided at the predetermined interval in the X-direction at the front part in the Z-direction. The engagement hole 156 is formed at a position that enables engagement of the lock pin 252 of the external lighting device 120 within an area held between the pair of first screw holes 151d.

The signal terminals 152a are exposed in the signal terminal connector 152 as shown in FIG. 4B and FIG. 5C. The position of the camera connector 206 is regulated by the engaged part distance T of the engaged member 151 in the pitch direction (X-direction) where the signal terminals 152a are juxtaposed. Accordingly, the holding member 254 of the external lighting device 120 is positioned by the engaged member 151 to the signal terminal connector 152.

Figure 6A:
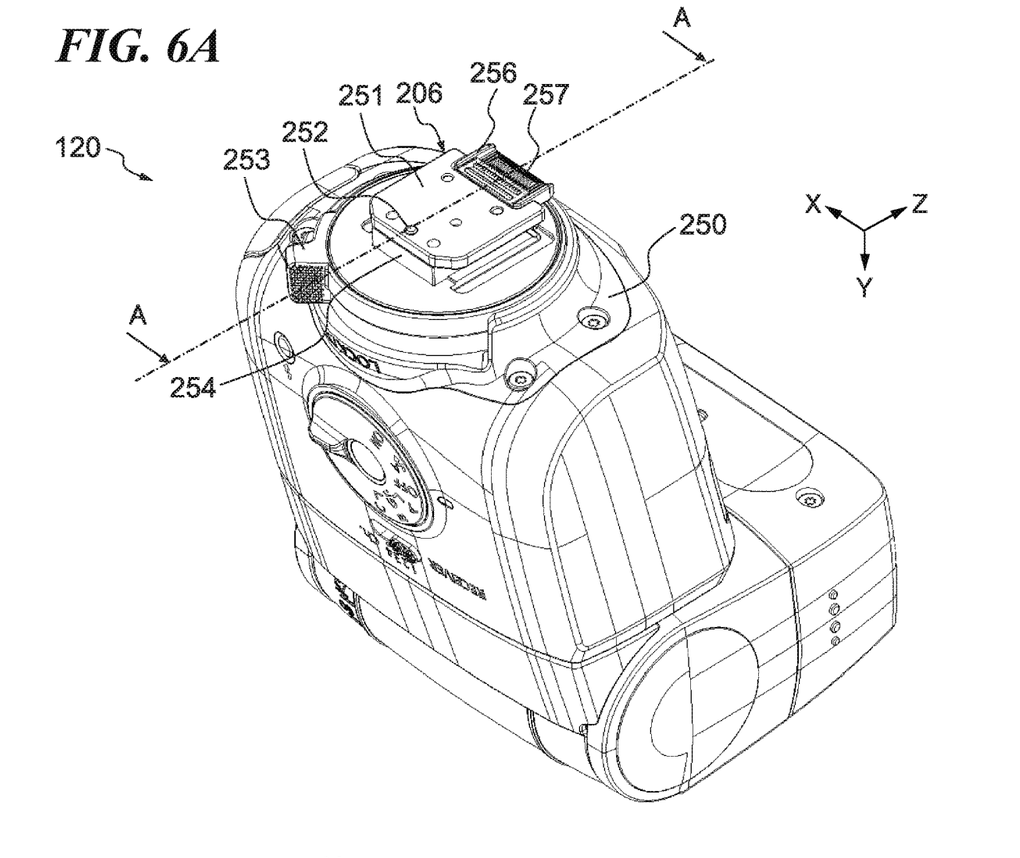
FIG. 6A is a perspective view showing the external lighting device.
Figure 6B:
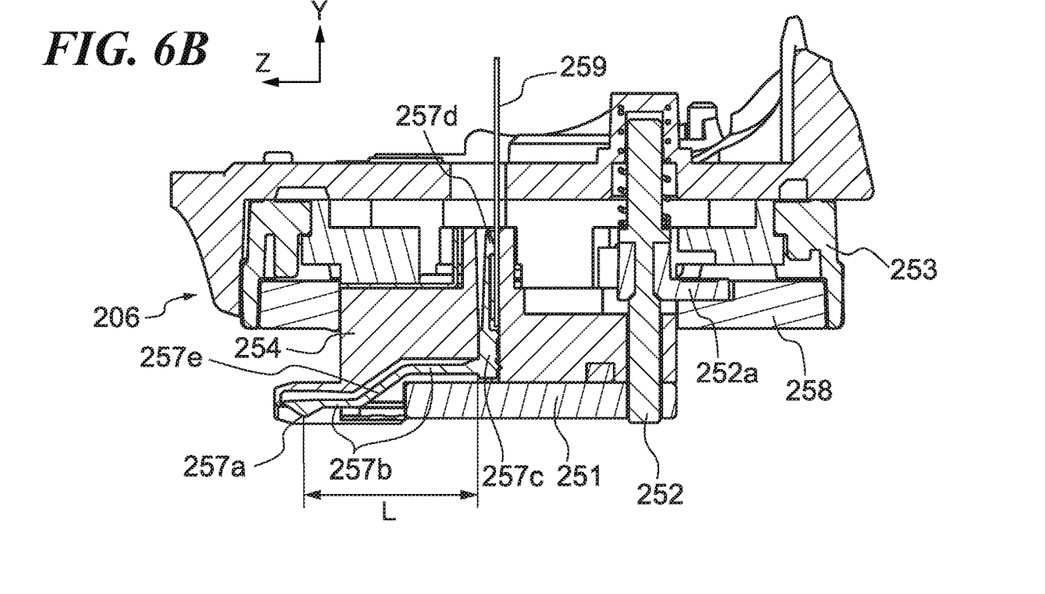
FIG. 6B is a sectional view showing a camera connector of the external lighting device taken along the line A-A in FIG. 6A.

Next, the external lighting device 120 will be described. FIG. 6A is a perspective view showing the external lighting device 120. FIG. 6B is a sectional view showing an internal structure of the camera connector 206 taken along the line A-A in FIG. 6A. The camera connector 206 of the external lighting device 120 is provided in a bottom of a base part 250 of the external lighting device 120 (-Y-direction side) in a regular mounting state to the accessory shoe 123 of the digital camera 100. The camera connector 206 is provided with a shoe mounting leg (shoe plate) 251, the lock pin 252, a lock lever 253, the holding member 254, a connecting plug 256, and a Y-direction holding member 258.

The shoe mounting leg 251 is an engagement member of the external lighting device 120 to engage the external lighting device 120 with the accessory shoe 123. Namely, the shoe mounting leg 251 is configured to engage with the engaged member 151. The shoe mounting leg 251 is formed by manufacturing a metal plate (sheet metal) that ensures high mechanical strength because the shoe mounting leg 251 is subjected to pressure applied to the external lighting device 120 and strong stress due to external force like an impact.

The lock pin 252 prevents the external lighting device 120 from falling after the shoe mounting leg 251 is engaged with the accessory shoe 123. The lock pin 252 is provided in the shoe mounting leg 251 so as to be movable in the Y-direction. A lever 252a is fit and fixed to the lock pin 252. The lock lever 253 and Y-direction holding member 258 are members for moving the lock pin 252, and are provided in the holding member 254.

When the external lighting device 120 is attached to the accessory shoe 123 and the lock lever 253 is rotationally operated, a cam part moves the Y-direction holding member 258 and lever 252a in the Y-direction. Since the lever 252a is engaged with the lock pin 252, the lock pin 252 also moves in the Y-direction together with the Y-direction holding member 258 and lever 252a at that time. Thus, the lock pin 252 engages with the engagement hole 156 provided in the engaged member 151 of the accessory shoe 123. The lock pin 252 and engagement hole 156 function as a position regulation member in the Z-direction for securing an electrical connection between the external lighting device 120 and the digital camera 100.

The connecting plug 256 is arranged at the front part of the camera connector 206 in the Z-direction and is made from non-conductive material (dielectric material), such as synthetic resin material. In the camera connector 206, the connecting plug 256 and holding member 254 are integrally formed from synthetic resin material. That is, the shoe mounting leg 251 has mechanical strength higher than the connecting plug 256 and holding member 254. The connecting plug 256 has a plurality of connection terminals 257 that contact the signal terminals 152a (see FIG. 5C) of the accessory shoe 123 for communication.

The connection terminals 257 correspond to the signal terminals 152a. The connection terminals 257 has a front end 257a in contact with the corresponding signal terminal 152a. Moreover, the connection terminal 257 has an extending part 257b that extends from the front end 257a backward in the Z-direction. The extending part 257b displaces the front end 257a in the Y-direction by elastic deformation when the front end 257a contacts the signal terminal 152a. A vertical rising part 257c is formed at the rear end of the extending part 257b in the Z direction so as to intersect perpendicularly with the extending part 257b. A flexible-substrate connection part 257d is formed at the upper end of the vertical rising part 257c. The flexible-substrate connection part 257d contacts the flexible substrate 259 connected to the main substrate (not shown) of the external lighting device 120 when the flexible substrate 259 is inserted.

An inclination part 257e is formed in the approximately central section of the extending part 257b to form a step in the Y-direction. The extending part 257b is elastically deformable in the Y-direction as mentioned above. However, if the length L of the extending part 257b is short, durability is lowered because the sufficient deformation amount cannot be obtained. As a result, when attachment and detachment between the signal terminal 152a and the front end 257a are repeated, there is a possibility of becoming easy to damage. Accordingly, the extending part 257b has the step in the Y-direction by providing the inclination part 257e in the approximately central section. This enables to keep the sufficient length L without interfering with the shoe mounting leg 251.

Figure 7:
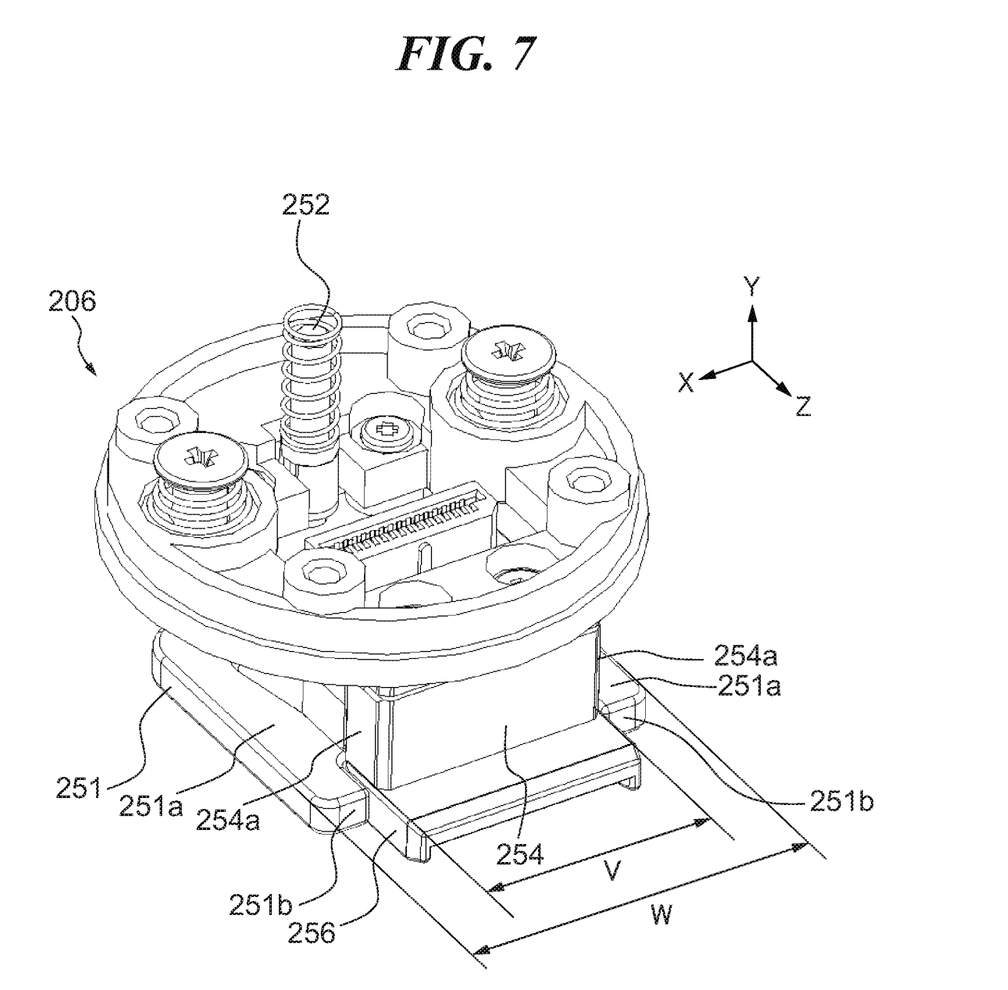
FIG. 7 is a perspective view showing an internal structure of the camera connector of the external lighting device.

FIG. 7 is a perspective view showing the internal structure of the camera connector 206 and shows a state where the base part 250 and lock lever 253 have been detached from the camera connector 206. The camera connector 206 is configured by fastening the shoe mounting leg 251 and the holding member 254. It should be noted that the fastening structure will be described later in detail.

The holding member 254 has a connection part 254a that is insertable (engageable) into the engaged part distance T of the engaged member 151 (see FIG. 5A). The width V of the connection part 254a is shorter than the width W of the shoe mounting leg 251. The position in the X-direction of the external lighting device 120 with respect to the digital camera 100 is settled when the connection part 254a is engaged with the engaged member 151 of the accessory shoe 123. Moreover, when contacting the elastic deformation parts 154a of the accessory shoe spring 154 (see FIG. 4A and FIG. 4B), the shoe mounting leg 251 is energized upward in the Y-direction and shoe fitting parts 251a contact the engaged member 151. This settles the position in the Y-direction of the external lighting device 120 with respect to the digital camera 100. Furthermore, when the abutting face 251b formed in the shoe mounting leg 251 abuts on the pair of abutting faces 154b provided in the accessory shoe spring 154, the position in the Z-direction of the external lighting device 120 with respect to the digital camera 100 is settled. It should be noted that the holding member 254 is also a structure for connecting the base part 250 with the shoe mounting leg 251. The lock pin 252 and connection terminals 257 are arranged inside the connection part 254a.

Figure 8A:
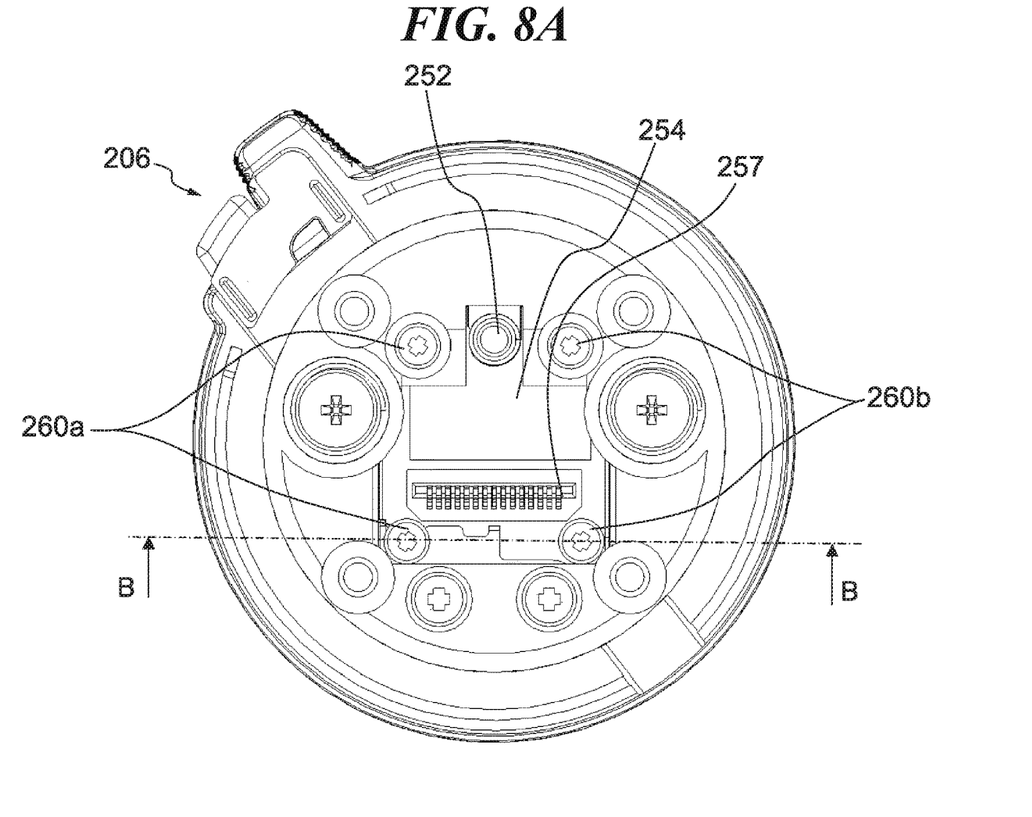
FIG. 8A is a top view of the camera connector.
Figure 8B:
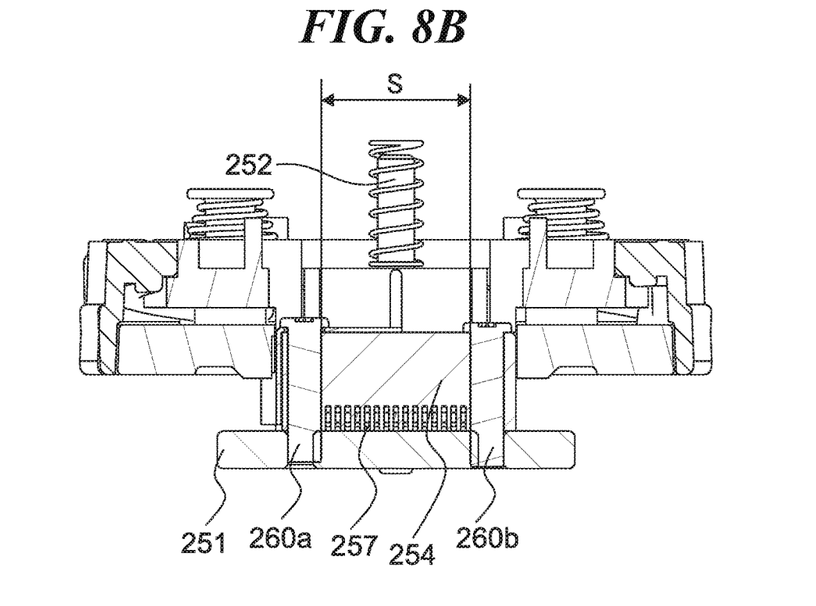
FIG. 8B is a sectional view showing the camera connector taken along the line B-B in FIG. 8A.

Next, the fastening structure of the holding member 254 and the shoe mounting leg 251 will be described. FIG. 8A is a top view (viewed from the upper side in the Y-direction) showing the camera connector 206. FIG. 8B is a sectional view showing the camera connector 206 taken along the line B-B in FIG. 8A.

A pair of first screws 260a and a pair of second screws 260b that are fastening members for fastening the shoe mounting leg 251 to the holding member 254 are arranged at the upper side in the Y-direction of the holding member 254. The pair of first screws 260a and the pair of second screws 260b are fastened to the shoe mounting leg 251 by inserting through the holding member 254.

The shoe mounting leg 251 is held by the holding member 254 with sufficient balance by respectively arranging the four screws to four areas that are equally divided in the X-direction and the Z-direction. Moreover, the shoe mounting leg 251 is subjected to strong stress as mentioned above. Accordingly, necessary mechanical strength is kept by fastening the metal-made shoe mounting leg 251 to the holding member 254 with the pair of first screws 260a and the pair of second screws 260b that are arranged with sufficient balance. Moreover, the connection terminals 257 are arranged in an area S between the pair of first screws 260a and pair of second screws 260b in the X-direction. Accordingly, the many connection terminals 257 are arranged while maintaining the above-mentioned mechanical strength. That is, multipolarization is achieved. The mechanical strength of the shoe mounting leg 251 is increased by attaching the lock pin 252 to the shoe mounting leg 251 in the area S.

Next, a synchronizer contact will be described. The shape of the accessory shoe 123 to which the external lighting device 120 is attached is regulated by the Japanese Industrial Standards (JIS). Specifically, the JIS regulate the shape of the engaged member 151 of the accessory shoe 123 that engages with the shoe mounting leg 251 of the external lighting device 120 and regulate the positional relationship between the external lighting device 120 and the synchronizer contact. In this embodiment, the synchronizer contact is arranged in the area S in which the shoe mounting leg 251 is fastened. In such a case, the synchronizer contact interferes with the connection terminals 257. This problem is avoidable by removing only a part of the connection terminals 257 that interferes with the synchronizer contact. Thus, the arrangement of the synchronizer contact is compatible with the improvement in mechanical strength of the shoe mounting leg 251 and the multipolarization of the connection terminals 257.

Although the present invention has been described in detail on the basis of the suitable embodiment, the scope of the present invention is not limited to the specific embodiment. The present invention includes various configurations that do not deviate from the gist of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-027511, filed Feb. 19, 2019, which is hereby incorporated by reference herein in its entirety.

What is claimed is:

1. A connecting device of an accessory that is detachably attachable to an accessory shoe device of an electronic apparatus, the connecting device comprising:
   an engagement member that is attachable to the accessory shoe device by sliding in a first direction with respect to the accessory shoe device;
   a holding member that holds the engagement member;
   a plurality of fastening members that fix the engagement member and the holding member, the plurality of fastening members including a first fastening member and a second fastening member; and
   a connecting plug that has a plurality of connection terminals and is arranged at a front part in the first direction of the holding member,
   wherein the first and second fastening members are arranged at positions that are spaced apart from each other in a second direction that perpendicularly intersects with the first direction,
   wherein a width of the holding member is shorter than a width of the engagement member in the second direction, and the plurality of connection terminals are arranged in an area between the position of the first fastening member and the position of the second fastening member and
   wherein unexposed portions of the plurality of connection terminals and the first and second fastening members are arranged in line in the second direction.

2. The connecting device according to claim 1, further comprising a lock pin that regulates a position of the connecting device for the electronic apparatus, and
   wherein the lock pin is arranged in the area between the positions of the plurality of fastening members in the second direction.

3. The connecting device according to claim 1, wherein the engagement member is made from metal.

4. The connecting device according to claim 1, wherein the engagement member has mechanical strength that is higher than the holding member.

5. The connecting device according to claim 1, wherein the plurality of fastening members comprise screws, and
   wherein the screws are fastened to the engagement member by inserting through the engagement member.

6. The connecting device according to claim 1, wherein the connecting plug and the holding member are integrally made from resin material.

7. The connecting device according to claim 1, wherein each of the plurality of connection terminals comprises a front end, and an extending part that extends in the first direction and displaces the front end in a third direction that perpendicularly intersects with both the first direction and the second direction in a case where the front end contacts a terminal of the electronic apparatus.

8. The connecting device according to claim 7, wherein the extending part has a step in the third direction.

9. An accessory that is detachably attachable to an accessory shoe device of an electronic apparatus, the accessory comprising:
   a connecting device comprising:
      an engagement member that is attachable to the accessory shoe device by sliding in a first direction with respect to the accessory shoe device;
      a holding member that holds the engagement member;
      a plurality of fastening members that fix the engagement member and the holding member, the plurality of fastening members including a first fastening member and a second fastening member; and
      a connecting plug that has a plurality of connection terminals and is arranged at a front part in the first direction of the holding member, and
   an accessory controller that communicates with the electronic apparatus through the connecting plug,
   wherein the first and second fastening members are arranged at positions that are spaced apart from each other in a second direction that perpendicularly intersects with the first direction,
   wherein a width of the holding member is shorter than a width of the engagement member in the second direction, and the plurality of connection terminals are arranged in an area between the position of the first fastening member and the position of the second fastening member, and wherein unexposed portions of the plurality of connection terminals and the first and second fastening members are arranged in line in the second direction.

10. An accessory connecting mechanism comprising:
a connecting device of an accessory that is detachably attachable to an accessory shoe device of an electronic apparatus, the connecting device comprising:
an engagement member that is attachable to the accessory shoe device by sliding in a first direction with respect to the accessory shoe device;
a holding member that holds the engagement member;
a plurality of fastening members that fix the engagement member and the holding member
the plurality of fastening members including a first fastening member and a second fastening member; and
a connecting plug that has a plurality of connection terminals and is arranged at a front part in the first direction of the holding member; and
the accessory shoe device comprising:
an engaged member that is engaged with the engagement member by sliding the connecting device in the first direction; and
signal terminals that are arranged at a front part in the first direction and contact the plurality of connection terminals in a state where the engagement member is engaged with the engaged member,
wherein the first and second fastening members are arranged at positions that are spaced apart from each other in a second direction that perpendicularly intersects with the first direction,
wherein a width of the holding member is shorter than a width of the engagement member in the second direction, and the plurality of connection terminals are arranged in an area between the position of the first fastening member and the position of the second fastening member, and
wherein unexposed portions of the plurality of connection terminals and the first and second fastening members are arranged in line in the second direction.

11. An electronic apparatus system comprising:
an accessory that is detachably attachable to an accessory shoe device of an electronic apparatus, the accessory comprising:
a connecting device comprising:
an engagement member that is attachable to the accessory shoe device by sliding in a first direction with respect to the accessory shoe device;
a holding member that holds the engagement member;
a plurality of fastening members that fix the engagement member and the holding member, the plurality of fastening members including a first fastening member and a second fastening member; and
a connecting plug that has a plurality of connection terminals and is arranged at a front part in the first direction of the holding member, and
the accessory shoe device comprising:
an engaged member that is engaged with the engagement member by sliding the connecting device in the first direction; and
signal terminals that are arranged at a front part in the first direction and contact the plurality of connection terminals in a state where the engagement member is engaged with the engaged member,
wherein the first and second fastening members are arranged at positions that are spaced apart from each other in a second direction that perpendicularly intersects with the first direction,
wherein a width of the holding member is shorter than a width of the engagement member in the second direction, and the plurality of connection terminals are arranged in an area between the position of the first fastening member and the position of the second fastening member, and
wherein unexposed portions of the plurality of connection terminals and the first and second fastening members are arranged in line in the second direction.

* * * * *